(12) United States Patent
Song

(10) Patent No.: US 9,032,395 B2
(45) Date of Patent: May 12, 2015

(54) METHOD FOR INSTALLING APPLICATIONS INSTALLED IN AN OLD MOBILE TERMINAL TO A NEW MOBILE TERMINAL

(75) Inventor: Sang-Min Song, Seoul (KR)

(73) Assignee: Gion Networks, Seoul (KR)

( * ) Notice: Subject to any disclaimer, the term of this patent is extended or adjusted under 35 U.S.C. 154(b) by 187 days.

(21) Appl. No.: 13/447,183

(22) Filed: Apr. 14, 2012

(65) Prior Publication Data

US 2012/0272232 A1 Oct. 25, 2012

(30) Foreign Application Priority Data

Apr. 21, 2011 (KR) .......................... 10-2011-0037274
May 23, 2011 (KR) .......................... 10-2011-0048478

(51) Int. Cl.
 *G06F 9/455* (2006.01)
 *G06F 9/44* (2006.01)
 *G06F 9/445* (2006.01)

(52) U.S. Cl.
 CPC .............. *G06F 8/61* (2013.01); *G06F 9/44505* (2013.01); *G06F 9/445* (2013.01); *G06F 8/63* (2013.01)

(58) Field of Classification Search
 CPC .............. G06F 8/65; G06F 8/61; G06F 8/54; G06F 21/14; G06F 8/63; G06F 9/445; G06F 9/44505
 See application file for complete search history.

(56) References Cited

U.S. PATENT DOCUMENTS 6,823,508 B1 * 11/2004 Burkhardt et al. ............ 717/174
7,530,065 B1 * 5/2009 Ciudad et al. ................. 717/174
7,739,659 B2 * 6/2010 Seki et al. ....................... 717/121
7,904,901 B1 * 3/2011 Tormasov et al. ............. 717/178
2003/0070164 A1 * 4/2003 Berstis ........................... 717/178
2006/0018454 A1 * 1/2006 Nonaka et al. ................. 379/225
2007/0044096 A1 * 2/2007 Choe .............................. 717/178

(Continued)

FOREIGN PATENT DOCUMENTS

CN 101044454 9/2007
JP 10260873 9/1998

(Continued)

OTHER PUBLICATIONS

Artem Garmash, A Geographic XML-based Format for the Mobile Environment, 2001, pp. 1-8.*

(Continued)

*Primary Examiner* — Thuy Dao
*Assistant Examiner* — Mongbao Nguyen
(74) *Attorney, Agent, or Firm* — Juan Carlos A. Marquez; Bacon & Thomas PLLC

(57) ABSTRACT

Disclosed is a method for installing applications between mobile terminals capable of easily installing applications installed in an existing mobile terminal in a new mobile terminal at the time of purchasing a mobile terminal. An installation apparatus extracts identification information regarding applications installed in a first mobile terminal from the first mobile terminal connected to communicate data with the installation apparatus for installing data. The installation apparatus extracts link information providing an access path of downloading and installing application files from an application market provided from a web based on the identification information or downloading applications from the application market. The installation apparatus transmits the application files to the second mobile terminal so as to be installed in the second mobile terminal or transmits the link information so as to be stored in the second mobile terminal.

24 Claims, 6 Drawing Sheets

(56) References Cited

U.S. PATENT DOCUMENTS

| | | | |
|---|---|---|---|
| 2007/0104054 A1* | 5/2007 | Senshu | 369/47.12 |
| 2007/0256056 A1* | 11/2007 | Stern et al. | 717/121 |
| 2009/0259991 A1* | 10/2009 | Mu | 717/121 |
| 2010/0063960 A1* | 3/2010 | Lehto | 707/621 |
| 2010/0107152 A1* | 4/2010 | Kwon | 717/174 |
| 2010/0162234 A1* | 6/2010 | Wang et al. | 717/178 |
| 2011/0010704 A1* | 1/2011 | Jeon et al. | 717/178 |
| 2011/0154314 A1* | 6/2011 | Balasubramanian | 717/171 |
| 2011/0296396 A1* | 12/2011 | Kurtakov | 717/171 |
| 2012/0072898 A1* | 3/2012 | Pappas et al. | 717/171 |

FOREIGN PATENT DOCUMENTS

| | | |
|---|---|---|
| JP | 2008243070 A | 10/2008 |
| JP | 2009237930 A | 10/2009 |
| JP | 2010218464 A | 9/2010 |
| KR | 1020050004403 A | 1/2005 |
| KR | 1020050075111 A | 7/2005 |
| KR | 1020090032455 A | 4/2009 |
| KR | 1020090064291 A | 6/2009 |
| WO | 2010141217 A | 12/2010 |
| WO | 2011018827 A | 2/2011 |

OTHER PUBLICATIONS

Priya Vijayakumar, Application-Independent Session Mobility Between User Terminals, 2005, pp. 1-10.*

Weidong Zhao, Integration Middleware for Mobile Supply Chain Management, 2009, pp. 1-4.*

* cited by examiner

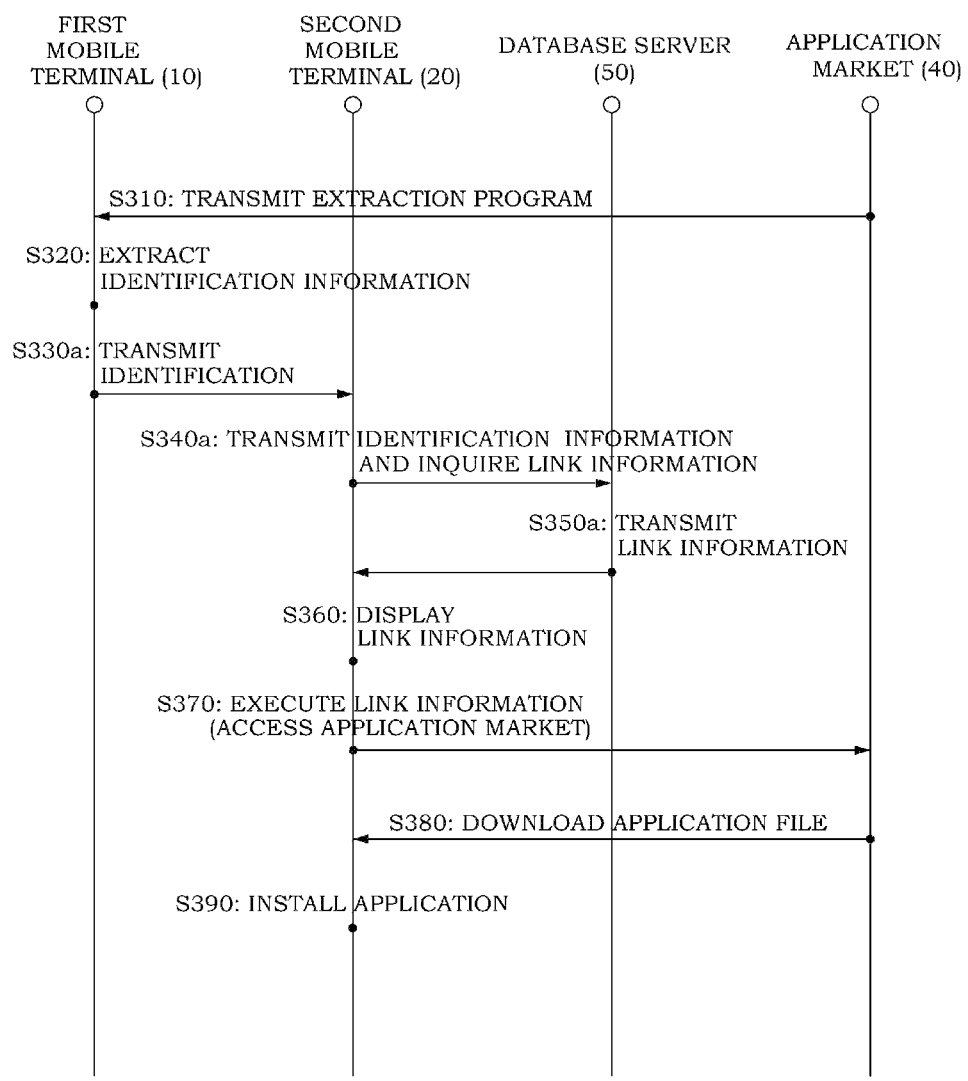

METHOD FOR INSTALLING APPLICATIONS INSTALLED IN AN OLD MOBILE TERMINAL TO A NEW MOBILE TERMINAL

RELATED APPLICATIONS

This application claims priority to Korean Patent Application No. 10-2011-0037274, filed on Apr. 21, 2011 and Korean Patent Application No. 10-2011-0048478, filed on May 23, 2011 in the Korean Intellectual Property Office, the entire contents of which are hereby incorporated by reference.

BACKGROUND OF THE INVENTION

1. Field of the Invention

The present invention relates to a method for transferring applications between mobile terminals, and more particularly, to a method for installing applications that has been installed in an old mobile terminal to a new mobile terminal easily.

2. Description of the Related Art

When replacing an existing mobile terminal with a new mobile terminal, there is a need to input various types of data stored in the existing mobile terminal to a new mobile terminal. A representative example of important data among data stored in the existing mobile terminal may include an address book data in which phone numbers, names, etc., are stored. An address book installation program for installing address book data from an old mobile terminal to a new mobile terminal has been previously commercialized.

The conventional installation program is installed in a computer furnished in, for example, an agency that sells mobile terminals, a service center that repairs mobile terminals, and the like, so as to configure an apparatus for installing an address book. The installation apparatus is connected to the old mobile terminal to read the address book stored in an old mobile terminal and transform the read address book into a data format suitable for a new mobile terminal, and transmits the converted data format to the new mobile terminal. In this manner, the address book data stored in the old mobile terminal is also stored in the new mobile terminal. With such a conventional installation apparatus, the user can use the address book without any inconvenience to input data individually.

Recently, as functions of a mobile terminal are becoming diversified, data to be installed to a new mobile terminal by a user among data stored in the existing mobile terminal has expanded. For example, in addition to the address book data, other types of user data have continually been increasing. In particular, many applications known as APPs may be installed in a smart phone. A smart phone is one example of a mobile terminal, which can function in ways similar to a computer. A tablet PC or a portable computer are additional examples (hereinafter, referred to as a 'portable terminal'). In the case of the conventional applications, a unit capable of automatically installing the existing mobile terminal to a new mobile terminal is not provided. Therefore, there is a problem in that a user newly installs the existing applications in a new mobile terminal one by one, each time he/she purchases a new mobile terminal. As a result, a user must reinstall individual applications, sometimes paying again for changed applications, and sometimes repeating an authentication procedure for applications to be authenticated so that a right to use the applications can be obtained, or the like. Further, a user may use several tens to several hundreds of applications, and thus, cannot accurately remember what applications he/she uses.

Further, a user must sometimes search each application through websites one by one, which is inconvenient and time consuming.

SUMMARY OF THE INVENTION

The present inventive concept is directed to solving conventional problems described above. Inventive concepts provide a method for installing applications between mobile terminals capable of easily installing applications installed in an existing mobile terminal in a new mobile terminal.

To accomplish this, according to one aspect of the present inventive concept, there is provided a method for installing applications installed in an old mobile terminal to a new mobile terminal, including, for example: a) extracting, by an installation apparatus, identification information regarding applications installed in a first mobile terminal from the first mobile terminal connected to the installation apparatus for installing data to perform data communication with the installation apparatus; b) extracting link information providing an access path so that the installation apparatus downloads and installs application files from an application market providing the application files based on the identification information, or downloads the applications from the application market; and c) transmitting the link information by the installation apparatus so that the installation apparatus transmits the application files to a second mobile terminal connected to perform data communication with the installation apparatus and installs the transmitted files in the second mobile terminal, or the second mobile terminal downloads the application files from the application market.

The method may further comprise prior to step a), transmitting an extraction program performing a function of extracting the identification information from the first mobile terminal and transmitting the extracted identification information to the installation apparatus from the installation apparatus to the first mobile terminal.

The installation apparatus may receive a database of the identification information regarding the individual applications from a predetermined database server in real time or may previously receive and store it therein, so as to download the application files from the application market at step b).

When operating systems of the first mobile terminal and the second mobile terminal are different from each other, the application market may be an application market corresponding to the operating system for the second mobile terminal at step b).

The installation apparatus may receive a database of the link information regarding the individual identification information from the predetermined database server in real time or may previously receive and store it therein, so as to extract the link information at step b).

Preferably, the method further comprises transmitting the installation program performing a function of installing the application files transmitted from the installation apparatus to the second mobile terminal in the second mobile terminal from the installation apparatus to the second mobile terminal.

At step a), the installation apparatus may extract the additional data generated as the user of the first mobile terminal uses the applications, together with the identification information. At step c), the installation apparatus may transmit and store the additional data to the second mobile terminal, together with the application files or the link information.

At step a), the installation apparatus may extract "use" information including at least one of a use frequency, a use point in time, and a use time by the user of the first mobile terminal for the applications, together with the identification information. At step c), the installation apparatus may transmit the "use" information to the second mobile terminal, together with the application files or the link information. The install application may display the "use" information to the outside through a display. The installation apparatus may receive a selection command for the applications selected by the user based on the displayed "use" information and the installation apparatus may perform step b) and step c) on the applications selected by the selection command.

At step a), the installation apparatus may extract license information regarding the applications of the user of the first mobile terminal, together with the identification information. At step b), the installation apparatus may provide the license information to the application market so as to download the applications. At step c), the installation apparatus may transmit the license information to the second mobile terminal, together with the link information.

According to another aspect of the present inventive concept, there is provided a method for installing applications installed in an old mobile terminal to a new mobile terminal, comprising: a) extracting, by a first mobile terminal, identification information regarding applications installed therein; b) extracting, by the first mobile terminal, link information providing an access path for an application market to which the applications are downloaded, based on the identification information; and c) transmitting, by the first mobile terminal, the link information to a second mobile terminal.

According to the other aspects of the inventive concept, there is provided a method for installing applications installed in an old mobile terminal to a new mobile terminal, comprising: a) extracting, by a first mobile terminal, identification information regarding applications installed therein and transmitting the extracted identification information to a second mobile terminal to allow the second mobile terminal to receive the identification information; b) extracting, by the second mobile terminal, link information providing an access path for an application market to which the applications are downloaded, based on the identification information; and c) downloading and installing the application files from the application market by accessing the second mobile terminal to the application market using the link information.

According to the various embodiments of the present inventive concept, when a user purchases a new mobile terminal, applications installed in the existing mobile terminal can be easily installed in a new mobile terminal.

BRIEF DESCRIPTION OF THE DRAWINGS

The above features and advantages of the various embodiments of the present inventive concept will become more apparent to those skilled in the related art in conjunction with the accompanying drawings. In the drawings:

FIG. 6 is a diagram showing a modified embodiment of FIG. 5.

DETAILED DESCRIPTION OF THE INVENTION

Hereinafter, preferred embodiments of the inventive concept will be described in more detail with reference to the accompanying drawings.

Figure 1:
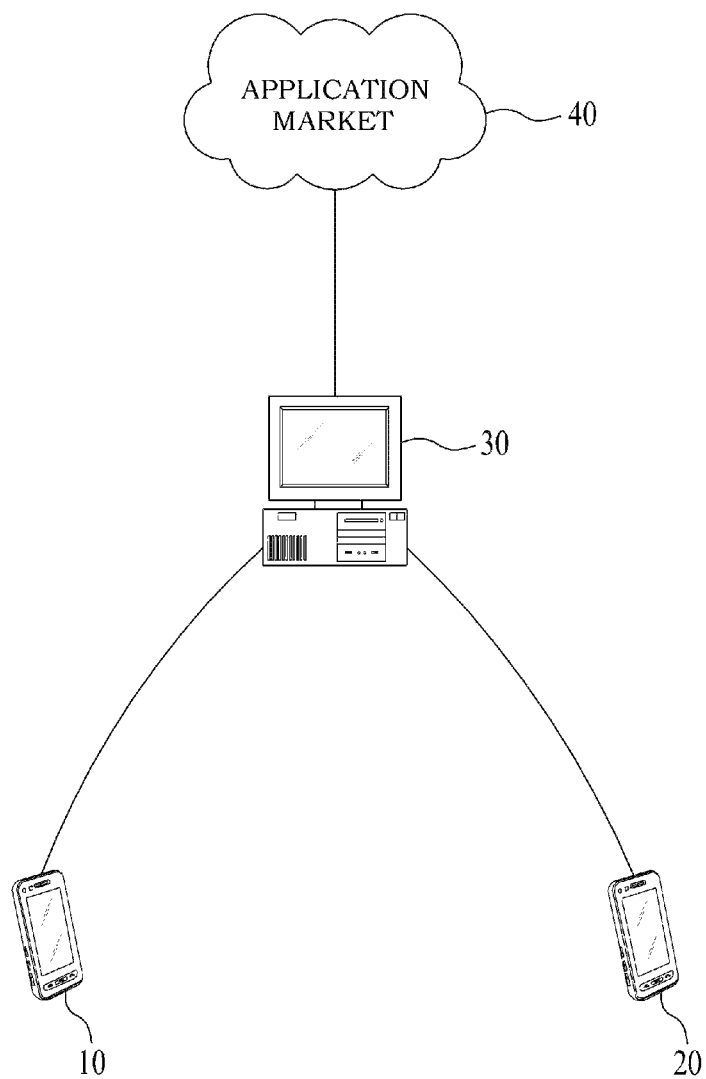
FIG. 1 is a diagram showing a state in which an apparatus for installing applications between mobile terminals is connected to existing and new mobile terminals, according to an embodiment of the inventive concept.

FIG. 1 is a diagram showing a state in which an apparatus for installing applications between mobile terminals is connected to existing and new mobile terminals, according to an embodiment of the inventive concept. As used herein, a 'mobile terminal' means all the types of terminals capable of having a function for driving or otherwise executing applications installed in the terminals. Mobile terminals can include, for example, a smart phone or terminals such as a tablet PC, or the like.

In FIG. 1, reference numeral 10 is an existing mobile phone (hereinafter, referred to as a 'first mobile terminal') used by a user, reference numeral 20 is a new mobile terminal (hereinafter, referred to as a 'second mobile terminal') that is newly used by a user, and reference numeral 30 is an installation apparatus 30 for performing an application install process between the first mobile terminal 10 and the second mobile terminal 20. The installation apparatus 30 can be a personal computer or the like and is installed with programs for performing the install method according to the inventive concept. Reference numeral 40 is an application market, which can be a website provided to download applications for mobile terminals 10 and 20 with some cost or no cost. Reference numeral 40 can mean, for example, an Android market or an App Store that is capable of providing applications for an iPhone or for an Android Smartphone. Further, the application market 40 according to the present inventive concepts means all the units that can allow the installation apparatus 30 to receive applications. For example, when distributing/circulating applications in the state in which the applications are stored in storage media such as a compact disk, a USB memory, or the like, an apparatus for reading storage media that is included in the installation apparatus 30 can read the storage media, such that the installation apparatus 30 may obtain the applications.

Figure 2:
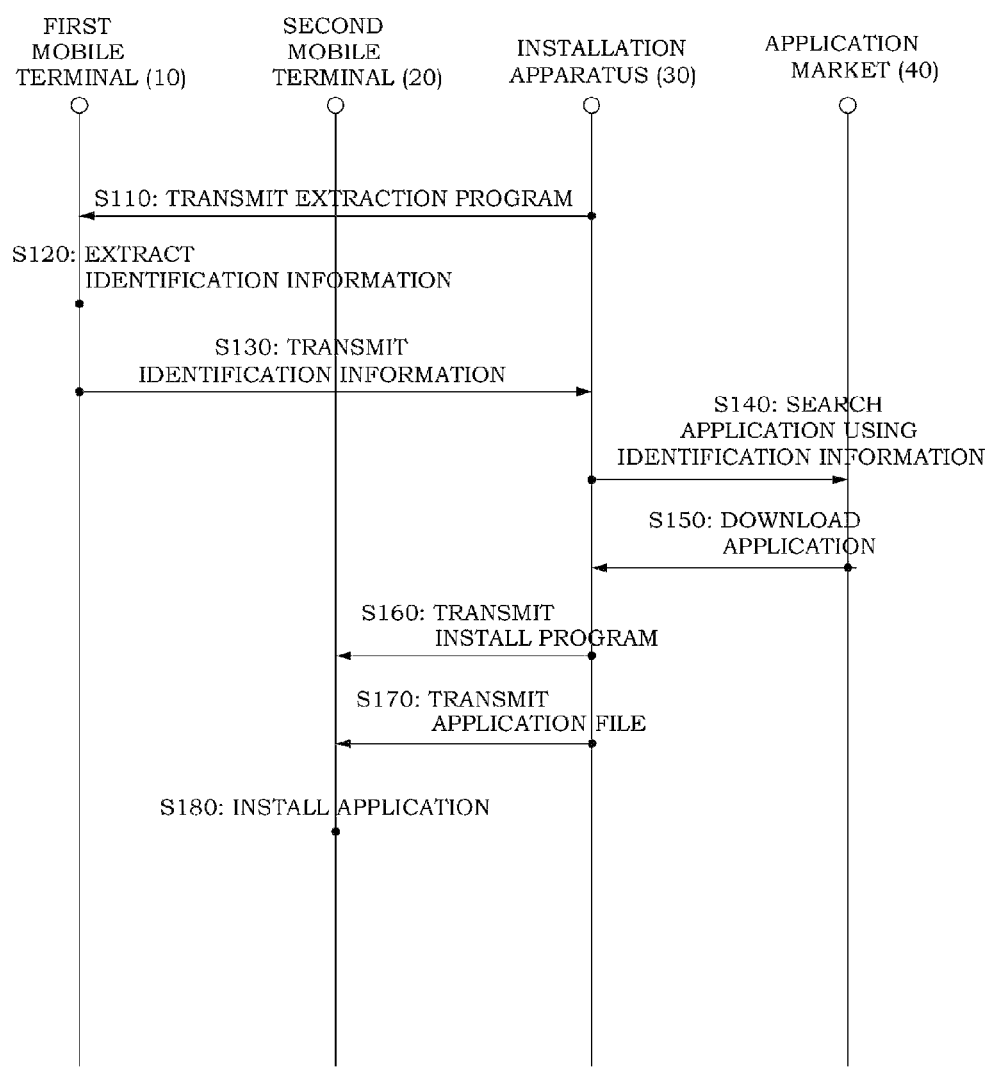
FIG. 2 is a diagram showing a process of installing applications performed by the installation apparatus shown in FIG. 1.

FIG. 2 is a diagram showing a process of installing applications performed by the installation apparatus shown in FIG. 1.

First, the first mobile terminal 10 is connected to the installation apparatus 30 so as to communicate data therebetween. The connection between the first mobile terminal 10 and the installation apparatus 30 is generally made by a wired cable such as a USB cable, but can adopt various schemes that can exchange data therebetween through broadband communication or short range communication such as Wi-Fi, Bluetooth, 3G, 4G, Wibro, near field communication (NFC) schemes, or the like. As the first mobile terminal 10 is connected to the installation apparatus 30, the installation apparatus 30 may recognize the kind of the first mobile terminal 10 to detect the kind of an operating system (OS) used by the first mobile terminal 10, or information regarding a data format adopted by the first mobile terminal 10, or the like. To this end, an operating system used for each type of mobile terminal or the information regarding a data format may be previously included in the installation apparatus 30.

When the first mobile terminal 10 is connected to the installation apparatus 30, the installation apparatus 30 transmits and installs extraction programs to and in the first mobile terminal 10 (S110). The extraction program, which is a program for extracting identification information regarding applications that are previously installed in the first mobile terminal 10, is fabricated to match various operating systems adopted in the mobile terminals, which is software previously included in the installation apparatus 30. Any one of the operating systems installed in the mobile terminals may support the function of the extraction program, and in some cases, does not need the extraction program. When not needed, the transmitting and installing of the extraction program (S110) is omitted. For example, in the case of the operating system that is adopted in an iPhone the identification information of the applications that are installed in the iPhone in advance can be permitted, and thus, the transmission of the extraction program is unnecessary. However, a so-called Android phone in which an operating system of Google is installed does not provide a function of extracting the identification information regarding applications, and therefore, the installation apparatus 30 has to be equipped with the extraction program previously that can be installed in the Android phone, and has to transmit and install the extraction program into the first mobile terminal 10.

In this case, the identification information is a type of code that differentiates applications from other applications. The identification information may be configured as information assigned to each application by a manufacturer of applications or by a manager of the application market 40 having the applications registered therein by the manufacturer. Further, the identification information may also be configured as unique information that can differentiate each application in a specific operating system. In addition, the identification information may also be configured as the unique information (for example, information such as a URL) that represents a position at the application market 40 of each application. All or substantially all applications include information that can differentiate them from one another. If no information is present, several types of information regarding applications are mixed, which can be used as the identification information. At present, the unique identification information differentiating the applications in all or substantially all of the common operating systems is present.

The extraction program extracts the identification information from the applications (S120) and transmits the extracted identification information to the installation apparatus 30 (S130), such that the extraction of the identification information is completed by the installation apparatus 30.

When the identification information is extracted from the first mobile terminal 10, the installation apparatus 30 can determine what types of applications are installed through the identification information. In order to specify the applications using the extracted identification information, the installation apparatus 30 can be assisted by an external database. That is, in order to specify the applications corresponding to the identification information, the installation apparatus 30 previously receives the identification information from the application manufacturer, the manager of the application market 40, or a separate database server (not shown) operated by an identification information management company that is contracted therewith, matches the identification information to each application and databases, and stores the matched identification information. Alternatively, the installation apparatus 30 may inquire and receive the database of data matched to the identification information and the applications from the database server in real time, or in other words, each time the install operation is performed. As an example, the database may include information for specifying positions of each application within the specific application market 40 or each application within the plurality of application markets 40.

The identification information may be encoded by the extraction program or the installation apparatus 30 so as to protect personal information.

The installation apparatus 30 accesses the application market 40 to search the applications corresponding to the identification information (S140). In this case, the installation apparatus 30 transmits the identification information to the application market 40 to search the applications. As described above, the installation apparatus 30 may search the corresponding applications in the application market 40 by using the information regarding the applications corresponding to the individual identification information obtained through the database server (not shown). If it is determined that the same applications are present in the application market 40, the installation apparatus 30 downloads the corresponding application files from the application market 40 (S150) and thus, the same application files are stored in the installation apparatus 30.

Next, the installation apparatus 30 can perform an operation of installing the downloaded application files into the second mobile terminal 20 that is a new mobile terminal.

The second mobile terminal 20 can first be connected to the installation apparatus 30 to communicate data therebetween and the connection method thereof is the same as the case of the first mobile terminal 20. FIG. 1 shows that the first mobile terminal 10 and the second mobile terminal 20 can be simultaneously connected to the installation apparatus 30. In some embodiments, after the extraction of the identification information from the first mobile terminal 10 is completed, the first mobile terminal 10 can be separated from the installation apparatus 30 and then, the second mobile terminal 20 can be connected thereto.

When the second mobile terminal 20 is connected to the installation apparatus 30, the installation apparatus 30 identifies the type of the second mobile terminal 20 to identify the operating system (OS), or the like, similar to the case of the first mobile terminal 10, and transmits and installs the installation program to and in the second mobile terminal 10 based thereon, if necessary (S160). When transmitting the application files to the second mobile terminal 20, the installation program is a program that is operated to perform the installation of the files transmitted to the second mobile terminal 20 and is a software that is configured so as to match various types of operating systems adopted in the mobile terminals, and can previously be included in the installation apparatus 30. Similar to the extraction program, the function of the installation program is supported by some operating systems. In this case, the transmission and installation of the installation program (S160) may be omitted.

Then, the installation apparatus 30 transmits the application files to the second mobile terminal 20 (S170). The installation program of the second mobile terminal 20 performs the installation operation of the received application files (S180), such that the applications installed in the first mobile terminal 10 are automatically installed in the second mobile terminal 20 that is a new mobile terminal.

According to one embodiment of the inventive concept, the applications installed in the existing mobile terminal are automatically installed in a new mobile terminal. Therefore, even when the user replaces the mobile terminal, he/she does not need to reinstall each of the used applications individually and does not need to remember a list of used applications, nor does the user need to search and install the applications in the application market 40 one by one.

Additional embodiments of the present inventive concept may be variously changed as follows.

There may be a case in which the operating system of the first mobile terminal 10 is different from the operating system of the second mobile terminal 20. For example, when the first mobile terminal 10 is an iPhone and the second mobile terminal 20 is an Android phone, the operating systems of the first mobile terminal 10 and the second mobile terminal 20 are different from each other, and thus, the application market 40 is also present as the application market to which the applications of the first mobile terminal 10 may be downloaded and an application market to which the applications of the second mobile terminal 20 may be downloaded. In this case, the applications installed in the second mobile terminal 20 should match the operating system of the second mobile terminal 20, and thus, objects to be searched at S140 becomes the application market for the second mobile terminal 20 rather than the application market for the first mobile terminal 10. Generally, the application manufacturer manufactures a single application into various types performing the same function so as to match a plurality of operating systems and registers the manufactured applications in the corresponding application markets, respectively. Therefore, various types of applications having the same function by the same manufacturer may be assigned with single identification information. Alternatively, even though various types of applications are assigned with different identification information, the installation apparatus 30 can be previously configured so that various types of applications are the same. As a result, after the installation apparatus 30 selects the application market 40 for the second mobile terminal 20 based on the types of applications that are identified for the second mobile terminal 20, the applications configured to correspond to the identification information using only the identification information extracted from the first mobile terminal 10 may be searched and downloaded in the application market 40 for the second mobile terminal 20.

Meanwhile, although the above-mentioned embodiment illustrates that the installation apparatus 30 extracts and transmits only the identification information at S120 and S130, the installation apparatus 30 may be configured to extract and transmit additional data that are added to the applications of the first mobile terminal 10. In this case, the additional data, which are data that are generated and stored as the user uses individual applications, are the same as environment setting data set by the user for the individual applications, data input by the user during the use of the applications, or data that are automatically generated by the applications during the use of the applications. For example, when there are applications for personal schedule management, the user may record the specific schedule in the personal schedule management programs and may perform the environment setting so as to ring an alarm one (1) hour before a defined time for the recorded schedule is reached. In one embodiment of the inventive concept, the additional data means the schedule data, the environment setting data, or the like. The additional data are input by the user according to the use of the applications or are generated and accumulated by the applications. Generally, the additional data are stored in a specific data folder assigned by the same applications.

In one embodiment of the present inventive concept, at S120 and S130, the extraction program extracts and transmits the additional data and the installation apparatus 30 receiving the extracted additional data transmits the additional data together at the time of transmitting the application files at S170. At S180, the installation program serves to install the application files in the second mobile terminal 20 and record the additional data in the data folder assigned by the applications. As a result, the applications are simply installed automatically as well as the individually accumulated data for each application and the environment setting state are identically implemented in the new mobile terminal automatically. Therefore, the "use convenience" of the user is further increased.

Further, at S120 and S130, the installalation apparatus 30 may be configured to extract and transmit the user information regarding the individual applications together with the identification information. Here, the "use" information means information including at least one of a use frequency, a use point in time, and a use time by the user of the first mobile terminal 10 for each application. This is information informing which applications the user uses at a certain frequency or certain preference. Generally, the installation apparatus 30 may receive the "use" information by storing the "use" information in the operating system as data corresponding to each application and extracting the extracted "use" information.

The "use" information may be used in various schemes. As an example, the installation apparatus 30 may transmit the "use" information together when transmitting the application files to the second mobile terminal 20 at S170. The "use" information may be displayed on the display of the second mobile terminal 20 before the process of installing the applications is performed at S180 and the user can know the information regarding the applications that are frequently used or are not actually used, based on the "use" information displayed on the installation apparatus 30. In this case, S140 to S180 may be performed by the selection of the user. That is, the installation apparatus 30 may input the individual selection commands for applications that ask a user inquiring the displayed "use" information whether the user wants to install each application in the second mobile terminal 20. The user downloads only the selected applications from the application market 40 and transmits the received applications to the second mobile terminal 20, such that he/she may selectively install the applications in the new mobile terminal. The "use" information may be processed into the specific form by the installation apparatus 30, or the like, so as to allow the user easily to know the use frequency for each application, or the like.

Meanwhile, at S120 and S130, the installation apparatus may be configured to extract and transmit license information that is stored in the first mobile terminal 10, together with the identification information. Here, the license information means the information authenticating that the user of the first mobile terminal 10 is a licensee assigned with the right use authority for the application installed in the first mobile terminal 10. The installation apparatus may be configured to download or use applications only when the user is assigned with a right to download applications or a right to use application from an application manufacturer or an application market manager. The reason for demanding the license that is a right to use applications is that a user pays a fee for downloading or using charged applications. However, at S150, the installation apparatus should have information verifying a fact that a user previously acquires the license through the settlement, or the like, so that the user of the second mobile terminal 20 in which these types of applications are downloaded or are newly installed uses the applications. Therefore, the installation apparatus 30 extracts the license information from the first mobile terminal 10 and provides the extracted license information to the application market 40 at the time of downloading, or selectively transmits and stores the license information to and in the second mobile terminal 20, such that the applications may also be installed or used in a new mobile terminal 20.

Figure 3:
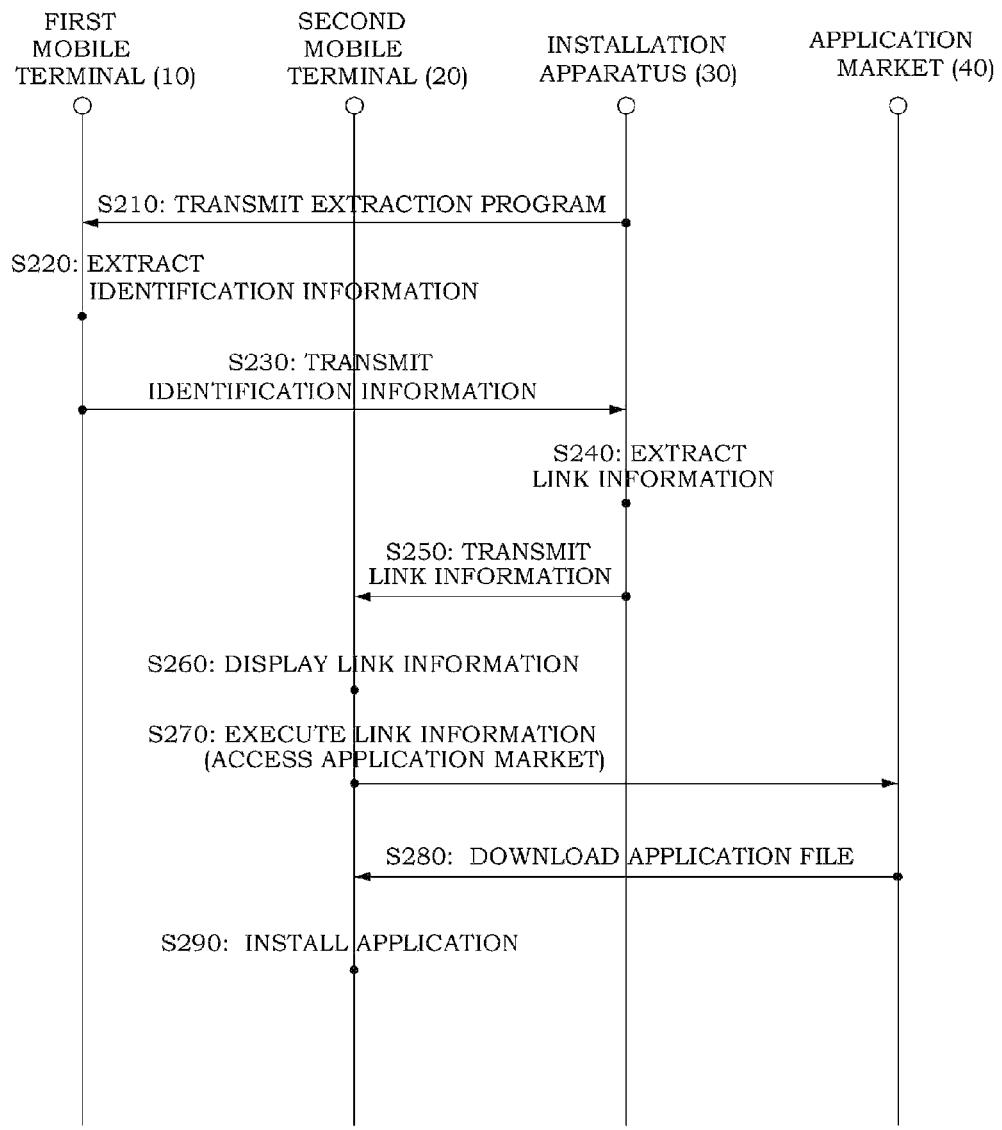
FIG. 3 is a diagram showing another embodiment of FIG. 2.

FIG. 3 is a diagram showing another embodiment of FIG. 2. In the description of the embodiment of FIG. 3, the description of the same components as those of the embodiment of FIG. 2 will be omitted for the sake of brevity.

In this embodiment, processes S210, S220, and S230 of allowing the installation apparatus 30 to transmit the extraction program to the first mobile terminal 10, and the first mobile terminal 10 to extract the identification information and transmit the extracted identification information to the installation apparatus 30, are substantially the same as processes S110, S120, and S130 of FIG. 2.

The difference between this embodiment and the embodiment of FIG. 2 is that the installation apparatus 30 extracts the link information based on the received identification information. Here, the link information is information (Uniform Resource Identifier (URI), which is a unique address indicating resources in the Internet, for example, HTML link information, or the like, in which applications corresponding to the identification information can be downloaded. When selecting and executing the link information, the executed terminal is linked to the screen to which the corresponding applications within the corresponding application market 40 can be downloaded to immediately download the applications corresponding to the identification information.

The installation apparatus 30 receives the link information corresponding to the individual identification information from the database (not shown) in real time or previously receives and stores it therein, as described above. Therefore, the installation apparatus 30 may receive the identification information from the first mobile terminal 10 to extract the link information corresponding to the received identification information (S240) and transmit the extracted link information to the second mobile terminal 20 (S250). The second mobile terminal 20 displays the received link information on the display (S260) to allow the user to access the link information. The user can execute the displayed link information to immediately access the screen to which the applications of the application market 40 indicated by the link information are downloaded. Therefore, the user can download the corresponding applications to the second mobile terminal 20 from the application market 40 (S280). The downloaded applications are installed by the second mobile terminal 20 (S290).

According to one embodiment of the inventive concept, the installation apparatus 30 provides the link information to the second mobile terminal 20 to enable a user to easily install the applications installed in the existing mobile terminal 10 in a new mobile terminal 20.

In addition, the installation apparatus 30 downloads the application files by allowing the second mobile terminal 20 to directly use the link information without executing a process of downloading application files from the application market 40 and again transmitting the downloaded application files to the second mobile terminal 20. Therefore, in accordance with this embodiment of the inventive concept, the occurrence of errors can be reduced during the process of installing the application. Further, the user of the second mobile terminal 20 may operate the second mobile terminal 20 to select whether the user directly reinstalls the individual applications.

Meanwhile, even in the embodiment of the present inventive concept, various modified examples that are adopted in the embodiment of FIG. 2 can be applied.

For example, when the operating systems of the first mobile terminal 10 and the second mobile terminal 20 are different from each other, the installation apparatus 30 extracts the link information regarding the application market 40 corresponding to the operating system of the second mobile terminal 20. The installation apparatus 30 may receive the link information of each application market 40 for the same applications from the above-mentioned database server, or the like.

In addition, the present embodiment extracts the additional data added to the applications of the first mobile terminal 10 at the time of extracting the identification information at S220 and transmits the extracted identification information when the installation apparatus 30 transmits the link information at S260, such that the additional data may be stored corresponding to the applications at the time of installing the application files at S290.

In addition, even in the present embodiment, the installation apparatus 30 may be configured to extract and transmit the "use" information regarding the individual applications together with the identification information and the usage of the "use" information is the same as the above-mentioned embodiment.

In addition, even in the present embodiment, the installation apparatus 30 may be configured to extract and transmit the license information regarding the individual applications together with the identification information. The usage of the license information is the same as the above-mentioned embodiment.

In addition, even in the present embodiment, similar to the embodiment of FIG. 2, the installation program may be transmitted and installed to and in the second mobile terminal 20 if necessary.

Figure 4:
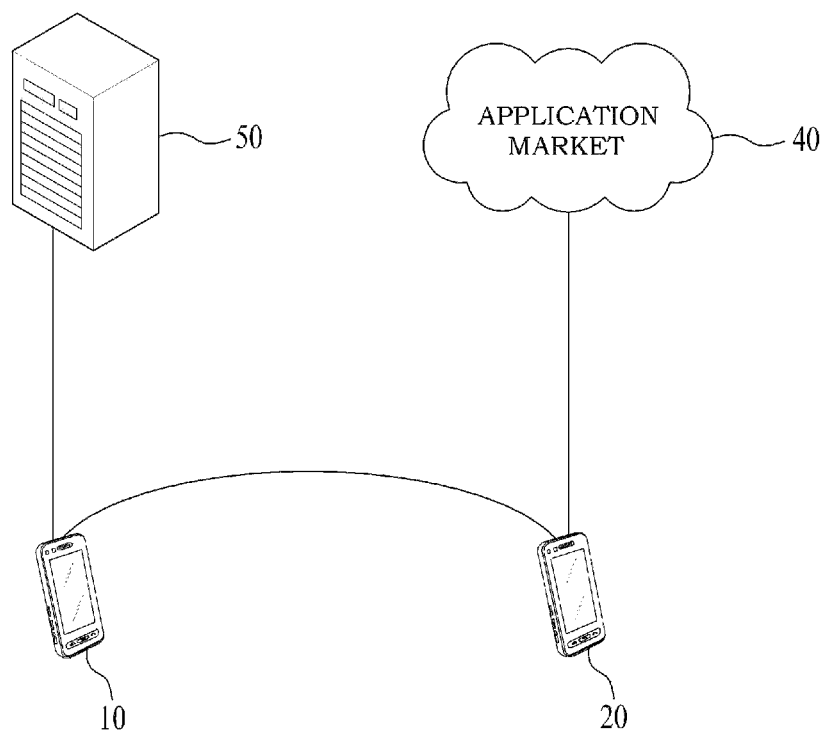
FIG. 4 is a diagram showing a state in which the existing and new mobile terminals are connected to each other so as to perform a method for installing applications according to another embodiment of the inventive concept.
Figure 5:
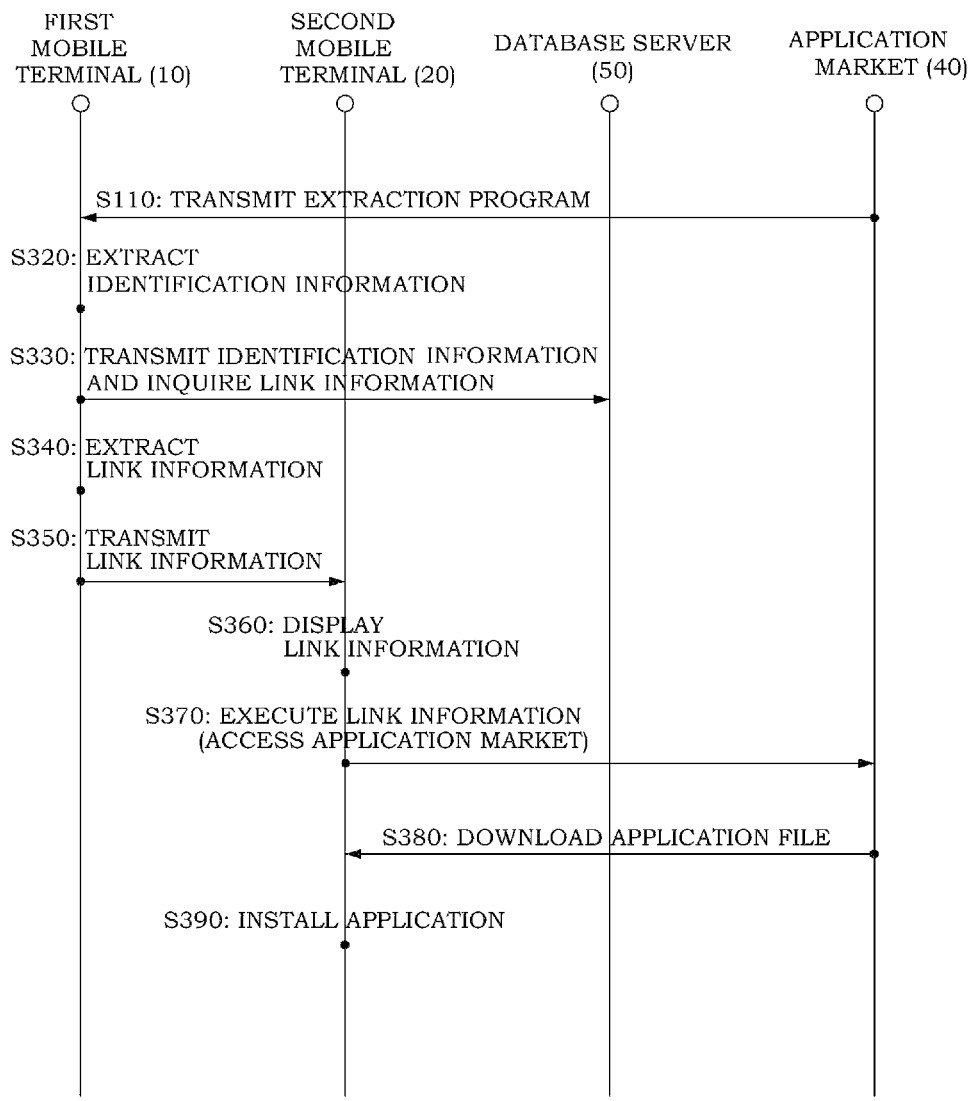
FIG. 5 is a diagram showing a process of installing applications in the state of FIG. 4.

FIGS. 4 and 5 are diagrams showing another embodiment of the inventive concept. FIG. 4 is a diagram showing a state in which the existing terminal is connected to a new mobile terminal and FIG. 5 is a diagram showing a process of installing applications in the state of FIG. 4. In FIGS. 4 and 5, the first mobile terminal, the second mobile terminal, and the application market that are the same components as those of FIG. 1 and are denoted by the same reference numerals. In the present embodiment, a database server 50 is additionally included.

Unlike the embodiments of FIGS. 1 to 3, here, the existing mobile terminal 10 is directly connected with the new mobile terminal 20 without passing through the installation apparatus 30 to directly perform the installation of the applications therebetween. That is, the present embodiment shows a process of performing the installation operation of the applications by the same programs in the state in which the separate installation program for installing the applications is installed. In this case, the method of installing applications is conceptually very similar to a process of transmitting link information shown in FIG. 3. However, the fact that the link information is transmitted without the installation apparatus 30 is different from the embodiment described with reference to FIG. 3.

Referring first to FIG. 4, the first mobile terminal 10 and the second mobile terminal 20 are connected to each other to perform the direct data communication therebetween. The connection therebetween can be made in various schemes such as a direct connection scheme by a wired cable, a connection scheme using near field communication such as Bluetooth, wireless Internet communication such as Wi-Fi or 3G, or the like.

Referring to FIG. 5, the first mobile terminal 10 first receives the extraction program for extracting the identification information of the applications installed therein from the application market 40 (S310). Here, the extraction program is a program that performs the same function as the extraction program in the above-mentioned embodiment. In the present embodiment, the extraction program is downloaded and installed from the application apparatus 40 of the first mobile terminal 10 since the installation apparatus is not separately present. Similar to the above-mentioned embodiment, a separate process of downloading the extraction program is not required when the operating system of the first mobile terminal 10 supports the function of the extraction program.

As described above, in the present embodiment, in order to allow the first mobile terminal 10 to perform the installation program for performing the install function of the applications, the installation program needs to be installed in the first mobile terminal 10. For the convenience of a user, the installation program may be previously installed when the first mobile terminal 10 is shipped. Alternatively, when the user wants to perform the install process according to the present inventive concept, the installation program may be downloaded from the application market 40 by the user and may be installed in the first mobile terminal 10. For the latter case, at S310, when the user performs the operation of downloading the installation program for the first mobile terminal 10 by fabricating the received extraction program and the installation program as the single program, the installation program (that is, including the extraction program) provided together with the extraction function of the identification information may be preferably provided to the first mobile terminal 10. As a result, the user may download the installation program for installing from the application market 40, or the like, by a process of downloading of the separate application, thereby installing the installation program having the install function and the identification information extracting function in the first mobile terminal 10 with one operation.

The first mobile terminal 10 extracts the identification information of the applications installed therein by executing the installation program (or extraction program) (S320). Next, the first mobile terminal 10 extracts the link information providing an access path for the application market 40 to which the applications corresponding to the identification information may be downloaded.

In order to extract the link information using the identification information, the first mobile terminal 10 accesses the database server 50. Here, the database server 50, which is a server operated by a manufacturer of the application, a manager of the application market 40, or a company that receives and manages the link information therefrom, is a server that databases and stores the identification information and the data for the link information corresponding thereto. The database server 50 is implemented by the same method as the database server according to the above-mentioned embodiment. When the first mobile terminal 10 accesses the database server 50 and transmits the identification information to the database server 50, the database server 50 uses the database therein to determine the link information corresponding to the identification information and transmit the link information to the first mobile terminal 10. Therefore, the transmission the identification information and the inquiry of the link information are performed by the first mobile terminal 10 (S330), and the first mobile terminal 10 receives the link information from the databases server 50 and can extract the link information (S340).

Meanwhile, similar to the above-mentioned embodiment, when the operating systems of the first mobile terminal 10 and the second mobile terminal 20 are different from each other, the link information regarding the application market 40 corresponding to the operating system for the second mobile terminal 20 needs to be extracted. When the first mobile terminal 10 is connected to the second mobile terminal 20, the installation program can read a type of operating system of the second mobile terminal 20.

In order to extract the link information, the embodiment of FIG. 5 illustrates a process (S330) of interfacing the first mobile terminal 10 to the database server 50 to transmit the identification information in real time and inquire the link information. However, before the first mobile terminal 10 performs the install process, the first mobile terminal 10 may previously access the database server 50 to download and store the database for the identification information and the link information, or download and store the database from the database server 50 after the extracting of the identification information (S320). In this case, the first mobile terminal 10 inquires the database downloaded thereto and stored therein to extract the link information.

When the extraction of the link information is completed, the first mobile terminal 10 transmits the extracted link information to the second mobile terminal 20 (S350). The following processes of allowing the second mobile terminal 20 to display the received link information (S360), to execute the link information according to the operation of the user to access the application market 40 (S370), and download (S380) and install the application files from the application files 40 (S390), are the same as the embodiment of FIG. 3 and therefore, a repetitive description thereof will be omitted for the sake of brevity.

Similar to the above-mentioned embodiment, when the operating system of the second mobile terminal 20 does not support the function of automatically installing the downloaded application files, the second mobile terminal 20 previously downloads and installs the installation program from the application market 40 as described above. In the present embodiment, the above-mentioned installation program is manufactured to include the function of the installation program to promote the convenience of a user. As a result, the installation program according to the present embodiment is manufactured to allow the first mobile terminal 10 to perform a function of extracting the identification information regarding applications, a function of extracting the link information corresponding to the extracted identification information, a function of transmitting the link information to the second mobile terminal 20 from the first mobile terminal 10, and to allow the second mobile terminal 20 receiving the link information to perform a function of executing the link information and accessing the application market 40 to download the application files and install the applications. Therefore, after the user receives the single installation program that is downloaded to the two mobile terminals 10 and 20, respectively, by the APP download scheme, the user can complete all the operations necessary for transferring the applications when the two mobile terminals 10 and 20 are connected to each other.

According to the present embodiment, the user downloads the installation program from the application market 40, or the like, and connects the first mobile terminal 10 with the second mobile terminal 20 to directly perform the data communication therebetween, thereby providing the convenience of installing the applications without the intervention of the separate installation apparatus 30.

Meanwhile, similar to the above-mentioned embodiment, the present embodiment may adopt a process of allowing the first mobile terminal 10 to extract the additional data together with the identification information at S320 and to transmit and store the additional data together with the link information to the second mobile terminal 20 at S350.

Similarly, at S320, the present embodiment may adopt a process of allowing the first mobile terminal 10 to extract the "use" information regarding the application at S320 and transmitting the "use" information together with the link information to the second mobile terminal 20 at S350, and a method of displaying the "use" information transmitted to the second mobile terminal 20 to the outside through the display thereof.

Similarly, the present embodiment may adopt a method of allowing the first mobile terminal 10 to extract the license information regarding the applications at S320 and a method of transmitting the license information together with the link information to the second mobile terminal 20 at S350. In this case, the second mobile terminal 20 may provide the license information to the application market 40 at S370.

FIG. 6 is a diagram showing a modified embodiment of FIG. 5.

The embodiment of FIG. 5 as described above illustrates that processes S330 to S350 are performed by the first mobile terminal 10. However, the modified embodiment of the present inventive concept illustrates that the above processes are performed by the second mobile terminal 20. FIG. 6 is the same as FIG. 5 except for only S330a, S340a, and S350a. The remaining steps are the same as FIG. 5. Therefore, the remaining processes are denoted by the same reference numerals and a repetitive description thereof will be omitted for the sake of brevity.

In the modified embodiment of the present inventive concept, the first mobile terminal 10 extracts the identification information at S320 and then, the extracted identification information is transmitted to the second mobile terminal 20 (S330a). The second mobile terminal 20 receiving the identification information transmits the identification information to the database server 50 to determine the link information corresponding to the identification information in the database server 50 (S340a). The database server 50 transmits the link information to the second mobile terminal 20 (S350a), and thus, the second mobile terminal 20 extracts the link information regarding the same applications. Thereafter, a process of allowing the second mobile terminal 20 to display the link information (S360), execute it (S370), and download (S380) and install the applications from the application market 40 (S390) is the same as the embodiment of FIG. 5.

Meanwhile, when the operating systems of the first mobile terminal 10 and the second mobile terminal 20 are different from each other, the first mobile terminal 10 may transmit the information informing the operating system thereof to the second mobile terminal 20 at the time of transmitting the identification information at S330a. Therefore, when the second mobile terminal 20 transmits the identification information at S340a, the second mobile terminal 20 transmits the operating system information of the first mobile terminal 10 (and, together with the operating system information of the second mobile terminal 20), thereby allowing the database server 50 to easily extract the link information required in the second mobile terminal 20 based on the operating system information at S350a.

Meanwhile, similar to the above-mentioned embodiment, this modified embodiment may adopt various processes such as a process of allowing the second mobile terminal 20 to transmit and install the installation program prior to S390, a process of allowing the second mobile terminal 20 to receive the additional data together with the identification information from the first mobile terminal 10, a process of allowing the second mobile terminal 20 to receive the use information together with the identification information from the first mobile terminal 10 to display them to the outside through the display of the second mobile terminal 20, and a process of allowing the second mobile terminal 20 to receive the license information together with the identification information from the first mobile terminal 10 and to transmit them to the application market 40, or the like.

Meanwhile, among the above-mentioned embodiments, the embodiments of FIGS. 2 and 3 are a scheme appropriate to be used in the sale agency of the mobile terminal or the service center performing A/S for the mobile terminal. That is, the agency or the service center configures the installation apparatus 30 to install the program performing the installation process according to the present inventive concept in the computer and as a result, performs the operation of the embodiments of the present inventive concept when the user wants to replace the existing mobile terminal with a new mobile terminal. Alternatively, when the user wants to reinstall the operating system of the used mobile system, the existing applications are deleted at the time of reinstalling the operating system. Therefore, the present inventive concept may be applied for easily reinstalling the existing applications.

The computer configuring the installation apparatus 30 according to the embodiments of FIGS. 1 to 3 generally includes a hard disk, a main memory, a CPU, an interface, a display, or the like. All the programs performing the installation process in the embodiment of FIGS. 2 and 3 can be stored in the hard disk and can be driven in the main memory at the time of starting the computer. Therefore, the CPU is operated as the main controller controlling the installation operation of the general applications. The interface provides a connection unit wherein the first mobile terminal 10 and the second mobile terminal 20 communicate data with the computer. Moreover, the display provides the unit of displaying the progress situation to the user during the install process.

The embodiments of FIGS. 4 to 6 are processes used when the user wants to perform an operation of installing applications from the existing mobile terminal to a new mobile terminal. As described above, in this case, the user receives the downloaded installation program by the APP download scheme and installs the installation program in the first mobile terminal 10 and/or the second mobile terminal 20 and connects them with each other. Therefore, the first mobile terminal 10 and the second mobile terminal 20 are each operated as a computer. Therefore, in this case, the first mobile terminal 10 and the second mobile terminal 20 can each include a flash memory, a main memory, a CPU, an interface, a display, or the like. In the embodiments of FIGS. 4 to 6, the installation program performing the install operation is stored in the flash memory and is driven in the main memory at the time of starting the computer. Therefore, the CPU can be operated as a main controller controlling the install of operating applications by the installation program, the interface provides a connection unit wherein the first mobile terminal 10 and the second mobile terminal 20 communicate data with each other, and the displays provide the unit of displaying the progress situation to the user during the installation process.

What is claimed is:
1. A method for installing applications installed in an old mobile terminal to a new mobile terminal, comprising:
  a) via an installation apparatus, extracting, identification information from the first mobile terminal connected to the installation apparatus to perform data communication with the installation apparatus, the identification information including information regarding applications installed in the first mobile terminal;
  b) extracting link information providing an access path so that the installation apparatus at least one of downloads and installs application files from an application market providing the application flies based on the identification information and downloads the applications from the application market;

c) transmitting the link information via the installation apparatus so that the installation apparatus transmits the application files to a second mobile terminal connected to perform data communication with the installation apparatus; and d) at least one of installing the transmitted files in the second mobile terminal and downloading via the second mobile terminal the application files from the application market, wherein the installation apparatus extracts use information including at least one of a use frequency, a use point in time, and a use time by the user of the first mobile terminal for the applications, together with the identification information, and the installation apparatus transmits the use information to the second mobile terminal, together with the application files or the link information.

2. The method of claim 1, further comprising:
prior to step a), transmitting an extraction program configured to extract the identification information from the first mobile terminal and transmit the extracted identification information from the installation apparatus to the second mobile terminal.

3. The method of claim 1, wherein the installation apparatus at least one of receives a database of the identification information regarding individual applications from a predetermined database server in real time and receives and stores the database of the identification information therein, so as to download the application files from the application market at step b).

4. The method of claim 1, wherein when operating systems of the first mobile terminal and the second mobile terminal are different from each other, the application market is an application market corresponding to the operating system for the second mobile terminal at step b).

5. The method of claim 1, wherein the installation apparatus at least one of receives a database of the link information regarding the identification information from a predetermined database server in real time and receives and stores the database of the identification information therein, so as to extract the link information at step b).

6. The method of claim 1, further comprising:
transmitting an installation program performing a function of installing the application files transmitted from the installation apparatus into the second mobile terminal.

7. The method of claim 1, wherein at step a), the installation apparatus extracts additional data generated as the user of the first mobile terminal uses the applications, together with the identification information, and at step c), the installation apparatus transmits and stores the additional data to the second mobile terminal, together with the application files or the link information.

8. The method of claim 1, wherein the install application displays the use information through a display.

9. The method of claim 8, wherein the installation apparatus receives a selection command for the applications selected by the user based on the displayed use information and the installation apparatus performs step b) and step c) on the applications selected by the selection command.

10. The method of claim 1, wherein at step a), the installation apparatus extracts license information regarding the applications of the user of the first mobile terminal, together with the identification information.

11. The method of claim 10, wherein at step b), the installation apparatus provides the license information to the application market so as to download the applications.

12. The method of claim 10, wherein at step c), the installation apparatus transmits the license information to the second mobile terminal, together with the link information.

13. A system having a memory storing executable instructions for installing applications installed in an old mobile terminal to a new mobile terminal, comprising:
an installation apparatus operatively configured to communicate with at least one of a first mobile terminal and a second mobile terminal, the installation apparatus being implemented so as to communicate with mobile terminals of different operating systems; and an application market data source implemented on a computer network that stores downloadable application files, wherein the installation apparatus is configured to extract identification information, use information and link information from the first mobile terminal when connected to the installation apparatus, the identification information including information regarding applications installed in the first mobile terminal, the link information providing an access path, the use information including at least one of a use frequency, a use point in time, and a use time by the user of the first mobile terminal for the applications, the installation apparatus at least one of downloads and installs application files from the application market data source providing the application files based on the identification information and downloads the applications from the application market data source, the installation apparatus is further configured to transmit the link information so as to transmit the application files to the second mobile terminal when connected to the installation apparatus, and the installation apparatus is configured to at least one of install the transmitted application files into the second mobile terminal and downloading via the second mobile terminal the application files from the application market data source, the installation apparatus transmitting the use information to the second mobile terminal, together with the application files or the link information.

14. The system of claim 13, further comprising:
an extraction program configured to extract the identification information from the first mobile terminal and transmit the extracted identification information from the installation apparatus to the second mobile terminal.

15. The system of claim 13, wherein the installation apparatus is configured to at least one of receive a database of the identification information regarding individual applications from a predetermined database server in real time, and receive and store the database of the identification information therein, so as to download the application files from the application market data source.

16. The system of claim 13, wherein when operating systems of the first mobile terminal and the second mobile terminal are different from each other, the application market data source is an application market data source corresponding to the operating system for the second mobile terminal.

17. The system of claim 13, wherein the installation apparatus is configured to at least one of receive a database of the link information regarding the identification information from a predetermined database server in real time, and receive and store the database of the identification information therein, so as to extract the link information.

18. The system of claim 13, further comprising:
an installation program configured to install the application files transmitted from the installation apparatus into the second mobile terminal.

19. The system of claim 13, wherein the installation apparatus extracts additional data generated as the user of the first mobile terminal uses the applications, together with the identification information, and
the installation apparatus transmits and stores the additional data to the second mobile terminal, together with the application files or the link information.

20. The system of claim 13, wherein the installation apparatus includes a display for displaying the use information.

21. The system of claim 20, wherein the installation apparatus receives a selection command for the applications selected by the user based on the displayed use information.

22. The system of claim 13, wherein the installation apparatus extracts license information regarding the applications of the user of the first mobile terminal, together with the identification information.

23. The system of claim 22, wherein the installation apparatus provides the license information to the application market data source so as to download the applications.

24. The system of claim 22, wherein the installation apparatus transmits the license information to the second mobile terminal, together with the link information.

* * * * *